Sept. 27, 1955   R. R. LEININGER   2,718,813
REPRODUCTION OF CONTOURS
Filed Feb. 19, 1952   2 Sheets-Sheet 2
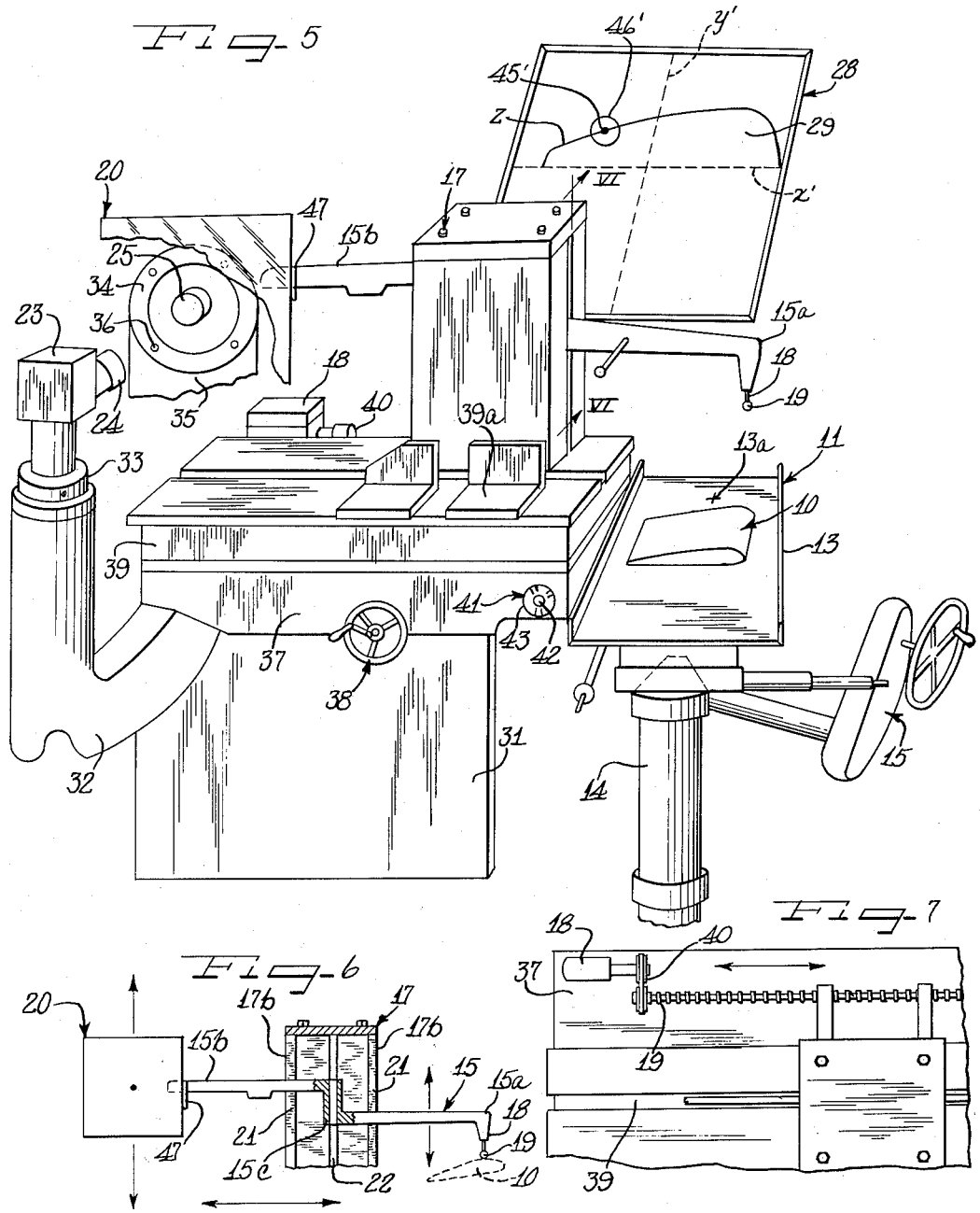
Inventor
Roger R. Leininger

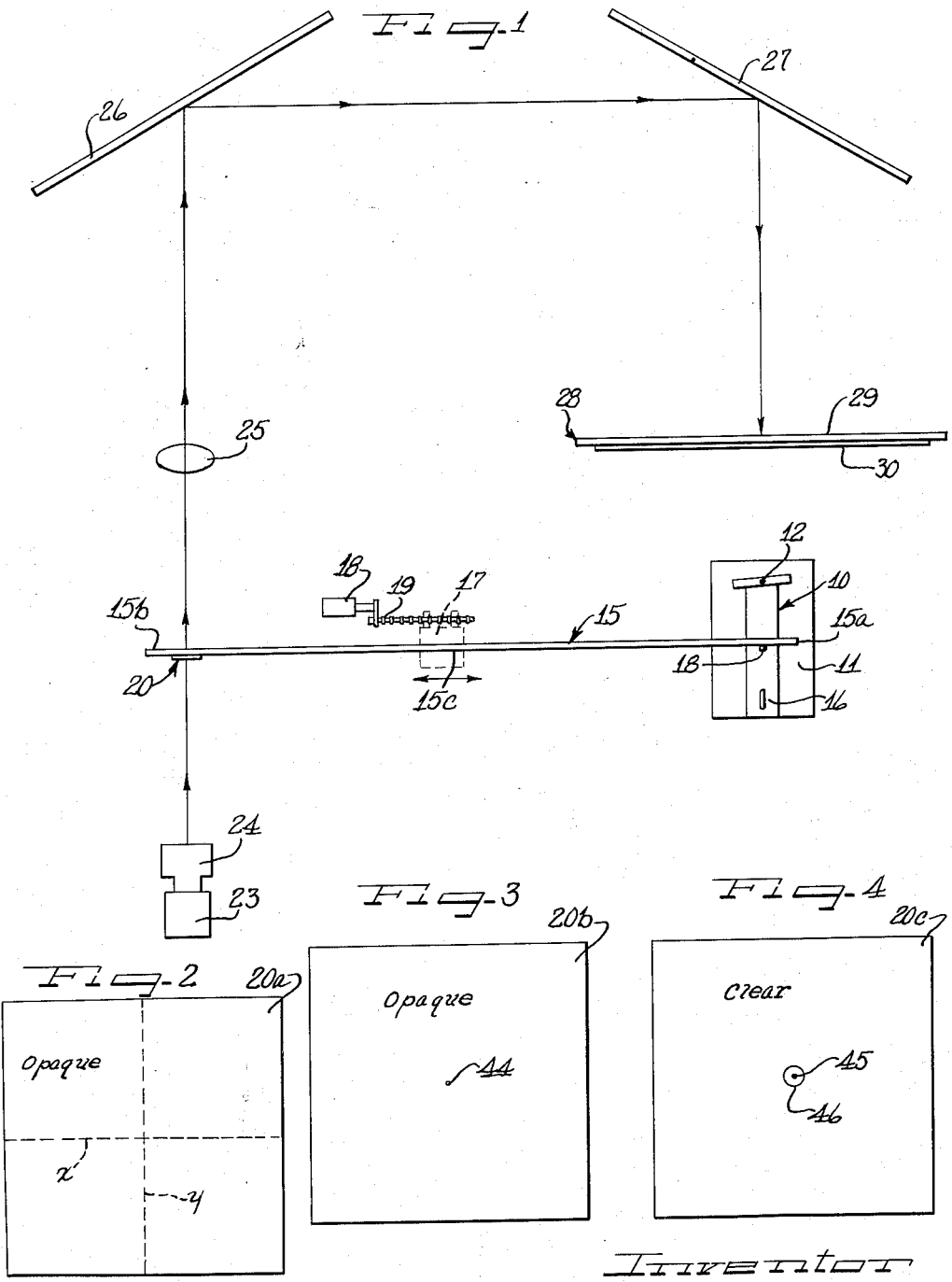

United States Patent Office 2,718,813
Patented Sept. 27, 1955

2,718,813

REPRODUCTION OF CONTOURS

Roger R. Leininger, Willoughby, Ohio, assignor to Thompson Products, Inc., Cleveland, Ohio, a corporation of Ohio Application February 19, 1952, Serial No. 272,325

1 Claim. (Cl. 88—24)

This invention relates to an improvement in the reproduction of contours, and more particularly, to an improved optical comparison method and optical comparator therefor involving the reproduction of the surface contours of various complexly contoured objects such as airfoils, turbine buckets and the like.

In general, a typical optical comparator comprises illuminating means, viewing means for receiving light rays from the illuminated means, usually in the form of a glass screen adapted to receive shadow images and having predetermined master die contour lines etched thereon, mounting means for an object to be compared, carrier means adapted for movement relative to the mounting means, and follow-up means movably mounted on the carrier means and adapted for cam-actuated follow-up movement by contacting the object on the mounting means. Usually the follow-up means has a small rotatable disk at the contact point thereof, to minimize friction during the cam-actuated movement, and the follow-up means mounts an auxiliary identical contact point which is adapted for movement with the first contact point and is so positioned with respect to the illuminating means that it casts a shadow image upon the vewing screen, so that the movement of that shadow may be used to compare the contour of the particular object with the master die contour lines etched upon the screen.

In view of the very close tolerances ordinarily permitted in the fabrication of many of such complexly contoured objects, it will be appreciated that materials lacking in dimensional stability such as paper, synthetic resin plastics and the like may not be used in place of the glass screen to mount or indicate the master die contour lines. On the other hand, etching of the master die contour lines upon the glass screen is a time-consuming comparatively difficult operation which leaves much to be desired from a commercial production point of view, particularly when it is desired to employ an optical comparator for checking a great plurality of objects or a great plurality of contour lines on each of a number of objects. In addition, the necessary correlation between the master die itself, the master die contour lines etched on the glass screen and a zero or reference point for use in setting up to test or compare a production die presents a truly difficult and complex problem from a production point of view.

The instant invention provides, among other things, a means and method for photographically reproducing the contour lines of a master die upon the viewing means, by the use of follow-up means mounting a sighting plate for cooperation with the illuminating means, and thereafter comparing the photographically reproduced master die contour lines with light signals projected by a follow-up mounted sighting plate during the coaction between such follow-up means and a suitably mounted object to be compared.

By the use of the instant invention, it is possible to quickly and easily obtain not only a clearly photographed master die contour line, but also a clearly photographed reference or zero line for use in cooperation with the light signal projecting follow-up means for zeroing the follow-up and mounting means and then comparing the projected light signals obtained during cam-actuated movement of the follow-up means with the master die contour lines photographed upon the viewing screen. Also, by the use of a dimensionally stable glass viewing screen arrangement containing light-sensitive photographic media, for example, sandwiched between glass plates, it is possible to obtain reliably and permanently reproduced contour lines. In addition, the instant apparatus and process are greatly simplified in that the use thereof may involve one or a plurality of readily replaceable sighting plates mounted upon the follow-up means.

It is, therefore, an important object of the instant invention to provide an improved optical comparison method and optical comparator therefor adapted for use in comparing contour lines of complexly contoured articles or objects on a mass production basis.

It is a further object of the instant invention to provide an improved optical comparison method and optical comparator therefor wherein master die contour lines may be suitably photographically reproduced in a dimensionally stable medium, such as the viewing screen.

It is another object of the instant invention to provide an improved optical comparison method and optical comparator therefor wherein zero or reference lines, as well as master die contour lines may be faithfully photographed by means of the light signals coacting with a specially prepared viewing screen and the contour lines of objects to be compared may be reproduced upon the viewing screen by means of light signals suitably adapted for clear comparison with the photographed contour lines.

It is still a further object of the instant invention to provide an optical comparator comprising illuminating means, viewing means for receiving light rays from the illuminating means, mounting means for an object to be compared, and follow-up means adapted for movement relative to the mounting means and for cam-actuated movement by contacting such an object on the mounting means, the follow-up means being adapted to mount a suitable sighting plate in the line of the light rays for producing a light signal to indicate the relative positions of the follow-up means and the mounting means.

It is still another object of the instant invention to provide an improved optical comparator comprising illuminating means, viewing means for receiving light rays from the illuminating means, mounting means for an object to be compared, carrier means adapted for movement relative to the mounting means, and follow-up means movably mounted on the carrier means and adapted for cam-actuated movement by contacting such an object on the mounting means, the follow-up means being adapted to selectively mount in the line of the light rays a first sighting plate for photographically actuating a light-sensitive medium mounted in the viewing means to produce a reference line indicating a zero relative position between the follow-up means and the mounting means, a second sighting plate having a pin hole adapted to focus a narrow light beam upon the viewing means for photographically actuating a light-sensitive medium therein to define a contour line corresponding to the movement of the follow-up means in cooperation with a master object on the mounting means, and a third sighting plate having a reticle thereon comprising a pin point dot and concentric tolerance ring therefor that is adapted to project the shadow image of such reticle upon the viewing means during movement of the follow-up means in cooperation with an object to be compared mounted in place of the master object.

It is yet a further object of the instant invention to provide an improved optical comparator comprising illuminating means, viewing screen means, means for focusing light rays from the illuminating means to a pin point area on the viewing screen means, an object mount, and follow-up means arranged for engaging an object on the mount and for movement relative thereto, the follow-up means being connected to one of the aforementioned means for movement thereof relative to the other two of the aforementioned means for moving the pin point light ray relative to the viewing means in a path corresponding to the contour of an object on the mount.

It is yet another object of the instant invention to provide an improved optical comparator comprising a lens and illuminating means therefor, movable carriage means adapted to interpose a sighting plate between the lens and the illuminating means, mirror means for receiving light from the illuminating means and through the lens and for reflecting the light received, viewing means for receiving the reflected light, the viewing means being adapted to mount a photographically reproduced master object contour line, and means movably carried by the carriage means for contacting an object to be compared for moving the carriage means relative to the lens and the mirror means to alter the reflected light path.

It is a further important object of the instant invention to provide an improved process of optically comparing the contour of an object with that of a master object, employing an optical comparator comprising illuminating means, viewing means for receiving light rays from the illuminating means, mounting means for such an object and follow-up means adapted for movement relative to the mounting means and for contacting such an object mounted thereon to be moved in accordance with the contour thereof, which process comprises first adjusting the mounting means and follow-up means to zero position and photographing a zero point image on the viewing screen by means of a suitable sighting plate mounted on the follow-up means for cooperation with the illuminating means; next photographing a master die contour line image on the viewing screen by means of the cooperation between the illuminating means and a suitable sighting plate mounted on the follow-up means during relative movement of the fololw-up means and a master die positioned on the mounting means; and then replacing the master object with an object to be compared in the same position on the mounting means and projecting, for comparison, light signals defining the contour thereof upon the viewing means by cooperation between the illuminating means and a suitable sighting plate during relative cooperative movement between the follow-up means and such object.

It is another important object of the instant invention to provide an improved process for comparing the contour of an object with that of a master object, employing an optical comparator comprising illuminating means, viewing means for receiving light rays from the illuminating means, a mounting means for such an object and follow-up means adapted for movement relative to the mounting means and for contacting such an object mounted thereon to be moved in accordance with the contour thereof, which process comprises first photographing a zero point image on the viewing screen by exposing a light-sensitive medium in said viewing screen to a zero point defining light rays by zeroing the follow-up and mounting means and affixing to the follow-up means a suitable sighting plate in the line of the light rays received by the viewing means, next photographing a contour line image on the viewing screen by exposing a light-sensitive medium in the viewing screen to the light passing through a pin hole plate mounted on the follow-up means in the position of said sighting plate while moving the follow-up means relative to the mounting means and contacting the follow-up means with a master object mounted in predetermined position on the mounting means; and then replacing the master object with an object to be compared in the predetermined position on the mounting means and projecting for comparison, the contour line defining light signals upon the viewing screen by a reticle bearing sighting plate mounted on the follow-up means in the position previously occupied by said other sighting plate while moving the follow-up means relative to the mounting means and contacting the follow-up means with the object mounted thereon.

Other objects, features and advantages of the present invention will become apparent to one skilled in the art from the following description of a preferred embodiment thereof illustrated in the accompanying drawings, in which:

On the drawings:

Figure 1 is a diagrammatical view of an optical comparator embodying the instant invention;

Figure 2 is an elevational view of a sighting plate for use in the instant invention, preferably, in imparting a zero position light signal;

Figure 3 is an elevational view of still another sighting plate for use in the instant invention, adapted to impart a pin point light ray signal;

Figure 4 is an elevational view of still another sighting plate for use in the instant invention, adapted to impart a reticle shadow image light signal;

Figure 5 is a view in perspective, showing the relative arrangement of various of the essential elements of the optical comparator of the instant invention;

Figure 6 is a fragmentary sectional elevational view taken substantially along the line VI—VI of Figure 5; and Figure 7 is a fragmentary top plan view, showing the carriage table of Figure 5.

As shown on the drawings:

In Figure 1, the reference numeral 10 indicates generally a complexly contoured object such as a turbine bucket or airfoil. The object 10, as shown, is suitably mounted upon a mounting table 11 and fixed in position thereupon, for example, by a suitably removable screw 12, clamps or other devices (not shown) for removably mounting the object 10 in fixed position upon the mounting table 11, of course, being equally suitable for the instant purpose.

The mounting table 11 is of the type well known for use in the machine tool art and, as shown in Figure 5, the table 11 presents a top, generally horizontal tray-like member 13 adjustably mounted upon a pedestal 14, and having suitable means designated generally by the reference numeral 15 for effecting vertical, as well as horizontal movement of the tray 15. Such positional adjusting means for the work-piece supporting tray 13 are well known and understood in the art and need not be considered in further detail herein.

Referring again to Figure 1, it will be seen that a follow-up arm 15 is suitably positioned for cooperation with the object 10 mounted upon the table 11. As shown, the object 10 has a blade 16 which extends generally longitudinally of the table 11, and the follow-up arm 15 is so positioned that longitudinal movement thereof involves lateral movement with respect to the blade 16. The follow-up arm 15 is mounted near the central portion thereof upon a suitable carriage, shown diagrammatically in dotted lines in Figure 1 at 17, and the carriage 17 is moved by a prime mover, such as the motor 18 in cooperation with a screwdriver 19 of the type well known. Such movement of the carriage 17 effects a generally longitudinal movement of the arm 15 mounted upon the carriage 17.

At one end 15a of the follow-up arm 15 there is mounted a suitable follower mechanism 18 which is adapted for cam-like cooperative engagement with the blade 16. Preferably the follower member 18 has a freely rotatable small disk-like member 19 mounted at the contact point thereof so as to minimize the frictional engagement between the follower means 18 and the object 10 during such cam-like cooperative engagement therebetween.

As is best seen in Figure 6, the opposite end 15b of the follow-up arm 15 is adapted to mount in a specific position, one of a plurality of suitable sighting plates, designated herein generally by the reference numeral 20, which will be discussed in detail hereinafter. Also, as shown in Figure 6, the carriage 17 comprises vertically upstanding front and back walls 17b, centrally slotted as at 21, so as to receive the follow-up arm 15. Although the carriage 17 may provide a variety of mounting means for the follow-up arm 15, all of which are well known in the art, in order to permit free vertical movement of the arm 15 relative to the carriage 17, in the instant case a centrally positioned vertical shaft 22 is mounted in the carriage 17 and the central sleeve-like portion 15c of the arm 15 is suitably apertured to receive for slidable cooperative engagement the shaft 22, so that the central sleeve-like portion 15c of the arm 15 engages the shaft 22 for free longitudinal movement relative thereto.

It will thus be seen that as the carriage 17 moves (as shown in Figure 6) in a horizontal direction generally longitudinally of the arm 15, the contact disk 19 engaging the object 10 is moved vertically upwardly or downwardly in accordance with the cam-like coaction between the surface contour of the object 10 and the contact disk 19. As a result, the entire follow-up arm 15 moves vertically in accordance with the vertical movement of the contact disk 19 during such cam-like cooperation. It will, of course, be appreciated that other mounting means such as a pivot for mounting the central portion 15c of the arm 15 would, likewise, permit movement of the entire pivot arm 15 in response to such cam-actuated cooperative movement. Such a mounting arrangement would, of course, result in movement of the sighting plate 20 in a direction exactly opposite to the direction in which the follower end 15a of the pivot arm moves, but, as those skilled in the art will readily understand from the following disclosure, such movement could be properly compensated for in the operation of the instant device. Also, it will be understood to those skilled in the art that the entire movement of the pivot arm 15 could take place in a horizontal plane instead of a vertical plane, the positioning of the object 10 and of the other cooperating elements of the instant device being arranged to correspond to such horizontal motion.

Also, as shown herein, the carriage 17 is the moving member whereas the mounting table 11 is stationary. It will also become apparent from the disclosure hereinafter that the opposite arrangement could be provided for relative movement between the carriage 17 and the mounting table 11.

Referring now again to Figure 1, wherein the entire illuminating arrangement is best shown, it will be seen that light is supplied by a suitable light source 23, which may be an electric light or other light source of suitable strength for the purposes of the instant invention. The light from the light source 23 is preferably first passed through a lens 24 mounted on the light source for cooperation therewith, principally for the purpose of projecting light therefrom in the form of generally parallelly arranged light rays, which rays next contact the sighting plate 20. Depending upon the particular design and arrangement of the sighting plate 20, which will be described in detail hereinafter, certain of the light rays pass through the sighting plate 20 and then through a lens 25. The light rays projected from the lens 25 are received by a first mirror 26 and reflected thereby to a second mirror 27, which in turn reflects the light rays back in a direction as shown substantially opposite to the initial direction thereof, as projected from the light source 23 and the lens 24 unit. Suitably positioned in the path of the light rays reflected from the second mirror 27 is a viewing screen indicated generally by the reference numeral 28. The arrangement of the lens 25 and first and second mirrors 26 and 27 is such that a magnification of approximately ten times is obtained at the viewing screen 28.

In the instant invention, the viewing screen or means 28 comprises a flat glass optical comparator screen 29, such as the screens ordinarily used in optical comparators for receiving shadow images thereupon and a sensitive photographic plate 30 placed flat against the comparator screen 29.

As shown in Figure 5, the instant device comprises a support member 31 upon which is mounted an arm 32 which extends outwardly and then upwardly to mount by suitable means a light source 23 and lens 24 unit, which may be threadedly engaged to the top of the arm 32, for example, by means of a locking nut 33. Suitable wiring and switch means (not shown) for the light source 23 may be mounted within the arm 32.

As can be seen, the light source 23 and lens 24 unit is adapted to project light rays in the direction of the lens 25, which is peripherally retained in suitable clamping means 34 mounted on a support member 35 by means of screws 36. The sighting plate 20 (shown fragmentarily) is adapted to be interposed between the lens 24 and the lens 25. The light passing through the lens 25 is reflected by the mirror means 26 and 27 (not shown in Figure 5) so that the light rays may be finally reflected back to the viewing screen 29 which is suitably positioned adjacent the other operating parts of the instant device so as to be easily viewed by the person operating the device. Such a mirror arrangement is well understood in the art and is not detailed herein.

A table top portion 37 is mounted upon the base support 31 and may be moved forward and backward by means of the hand wheel and screw arrangement designated generally by the reference numeral 38 mounted upon the base support 31. Slidably mounted upon the movable table top 37 is a carriage base 39 which is adapted to be moved transversely of the movement of the top 37. Such transverse movement of the carriage base 39 is, is has been pointed out hereinabove, movement that is longitudinal of the arm 15. Such movement of the carriage base 39 is accomplished by driving the screw member 19 by means of the gear system 40 which is operated by the motor 18. The motor 18 is adapted to operate forward and backward and at various control speeds so as to control the rate of movement of the carriage 17 mounted on the carriage base 39, as by means of the brackets 39a, and also to effect uniform movement thereof. A switch unit designated generally by the reference numeral 41 may be used to operate the motor, comprising an on and off switch member 42 and a speed control switch member 43 for forward and backward movement.

Referring now to Figures 2, 3 and 4, showing the sighting plates 20a, 20b and 20c, respectively, it will be seen that each of the sighting plates is a substantially flat, square or rectangularly shaped thin piece of rigid material. The sighting plate 20a consists of a piece of glass that has been coated to render it substantially opaque except for pin point holes therein arranged to form intersecting ordinate and abscissa lines x and y. The sighting plate 20b is also a glass plate that has been rendered substantially opaque by coating the same except for a small centrally located pin hole or translucent region 44. The sighting plate 20c is a substantially clear translucent glass plate having centrally located thereon a small pin point black dot 45 and a relatively small concentric tolerance ring 46 therefor.

In the operation of the instant device the sighting plate 20a is suitably mounted in a fixed predetermined position at the end 15b of the follow-up arm 15. The sighting plate 20a may be mounted by any suitable clamping means (not shown) but a fixed backing member 47 is mounted on the arm 15 so that the precise position horizontally as well as vertically of the sighting plate 20 may be fixed, and in subsequent operating steps the other sighting plates 20 may each be placed in precisely the same position on the follow-up arm 15 and affixed thereto in the same manner.

Next, the mounting table 11 and the follow-up arm 15 are moved into a zero or reference position. This may be accomplished merely by moving the mounting table 11 upwardly (as shown in Figure 5) until the tray portion 13, at a predetermined point 13a, contacts the disk contack 19. In such an arrangement, wherein the disk 19 is in contact with the tray at 13a and the sighting plate 20a is suitably positioned between the lenses 24 and 25, a zero or reference position between the arm 15 and the mounting table 11 may be established so that such zero position may be reobtained if the table 11 is moved away to effect the replacement of the object 10 to be compared thereon. When such zero position is reached, the light source 23 is turned on, as by suitable switch means (not shown), and the light rays pass through the pin holes in the sighting plate 20a defining the abscissa and ordinate lines $x$ and $y$. Such light rays then pass through the lens 25, the mirror means 26 and 27 and are reflected upon the viewing means 28 (from which light is otherwise excluded at this time). The sensitive photographic plate 30 is thus photographically activated at the pin point areas illuminated by such light rays.

In the next step of the process the sighting plate 20a is replaced by the sighting plate 20b placed in precisely the same position with respect to the follow-up arm 15. A master object 10 (which may or may not have been placed upon the tray prior to the first step) is suitably fixed in position upon the mounting tray 13 (indefinite predetermined relationship to the point 13a) and the follower disk 19 is brought into contact with the master object 10, preferably at one side or the other thereof, and the motor 18 is turned on at the desired speed so as to move the follower disk 19 over the top surface of the master object 10. It will be appreciated, of course, that as the follower disk moves over the master object 10 the cam-like cooperation therebetween causes the follow-up arm 15 to move vertically corresponding to the contour of the master object 10 and the sighting plate 20b likewise moves vertically in this respect as well as horizontally to correspond to the carriage 17 movement. While such movement is taking place, the light source 23 is turned on so that a beam of light passing through the pin hole 44 in the plate 20b may be projected through the lens 25 and the mirror means 26 and 27 and on to the viewing screen 28, so as to photographically activate the sensitive photographic plate 30. Such photographic activation will, of course, take place along a line corresponding to the contour of the portion of the master object 10 contacted by the follower disk 19.

After this operation has been completed, the photographic plate 30 is developed and the images affixed thereon (as shown in Figure 5) include the image $x'$ of the line $x$, the image $y'$ of the line $y$, each of which is obtained from the photographic effect of the first sighting plate 20a, and the image $z$ corresponding to the travel of the pin hole 44 and defining the path taken by the pin point light rays which pass from the pin hole 44 to the viewing screen 28.

In the next step of the operation, the sighting plate 20c is positioned on and affixed to the follow-up arm 15 in the aforementioned predetermined position in place of the sighting plate 20b, and an object to be compared is placed on the mounting table 11 in place of the master object. In such an arrangement, when the light source 23 is turned on, the reticle projecting sighting plate 20c causes the shadow image of the black dot 45' and concentric tolerance ring 46' to appear on the viewing screen 29 (for example, as shown in Figure 5).

After the new object 10 to be compared has been placed on the mounting table 11, it is, of course, necessary to zero the mounting table 11 and the arm 15. This is done by bringing the disk contact 19 and the mounting table 11 into the zero position (contacting at point 13a) corresponding to the position previously obtained and so adjusting the arm 15 and the mounting table 11 in such position that the reticle projected by the sighting plate 20c is centered at the intersection between the line images $x'$ and $y'$. Then, the disk 19 is brought into contact with the top surface of the object 10 and moves across the object 10, by suitable operation of the motor 18. During such movement of the disk 19 across the object 10, the reticle image appears to move across the viewing screen 29 and, if the contour of the piece to be compared is exactly that of the corresponding portion of the master object, then the reticle appears to be centered on the line $c$ as it moves across the viewing screen 29, such as is shown in Figure 5 (in exaggerated size on the viewing screen 29). Of course, if the dot image 45' of the reticle image deviates from the contour line $c$, then it is clear that the contour of the object being compared is different from the contour of the master object which was employed to photographically produce the line $z$ in the viewing means 28.

As shown herein the viewing means 28, light source 23, lens 25, mirrors 26 and 27 and mounting table 11 maintain fixed positions while the carriage 17 (and the arm 15 borne thereby) moves, so as to produce moving light signals on the screen 29. It is, however, apparent that other relative movements between the essential elements could take place to accomplish the same light signal movement upon the screen 29 (although the disclosed arrangement is generally preferred). For example, the carriage 17 might be fixed, and the mounting table 11 and screen 29 moved; or alternatively, the light source 23 could be fixed or mounted on or as a part of the sighting plate 20 so as to move therewith upon movement of the carriage 17.

An important feature, however, is the particular moving means: the motor, which as the motor 18 is shown to do, is capable of uniform movement of the carriage and thereby uniform movement of the light beam crossing the screen, for example, during the use of the pin hole plate 20b. This is important in obtaining uniform clear-cut photographic exposure so as to clearly define the contour line $z$ on the screen 29.

Also, it will be appreciated that the instant sighting plates 20a, 20b and 20c represent preferred embodiments of sighting plates for use in the invention. Actually, plate 20b, for example, might be used to carry out the functions of all three plates 20a, 20b and 20c, as can be readily appreciated. The basic idea in this respect involves the use of a "'sighting plate," a plate at least partially opaque and partially translucent, which has thereupon a "sighting" arrangement or configuration capable by means of a light transmission contrast to impart a light signal (image or shadow) upon the screen 29. Preferably the plate and cooperating illuminating means and lens are capable of focusing light rays upon a pin point area on the screen.

It will, of course, be understood that various details of construction may be varied through a wide range without departing from the principles of this invention, and it is, therefore, not the purpose to limit the patent granted hereon otherwise than necessitated by the scope of the appended claims.

Having described my invention, I claim:

A process of preparing a viewing screen for use in comparing the contour of an object with that of a master object, employing an optical comparator comprising illuminating means, viewing means for receiving light rays from said illuminating means, mounting means for such an object and follow-up means adapted for movements relative to said mounting means and for contacting such an object mounted thereon to be moved in accordance with the contour thereof, which process comprises first photographing a zero point image on said viewing screen by exposing a light-sensitive medium in said viewing screen to zero point defining light rays by zeroing said follow-up and mounting means and affixing to said follow-up means a suitable sighting plate in the line of said light rays received by said viewing means, and then photographing a contour line image on said viewing screen by exposing a light-sensitive medium in said viewing screen to the light passing through a pin hole plate mounted on said follow-up means in the position of said sighting plate while moving said follow-up means relative to said mounting means and contacting said follow-up means with the master object mounted in predetermined position on said mounting means.

References Cited in the file of this patent

UNITED STATES PATENTS

| | | |
|---|---|---|
| 2,035,780 | Beardsley | Mar. 31, 1936 |
| 2,214,376 | Kurtz | Sept. 10, 1940 |
| 2,386,806 | Ledoux | Oct. 16, 1945 |
| 2,444,639 | Elder | July 6, 1948 |
| 2,451,155 | De Boer | Oct. 12, 1948 |
| 2,476,312 | Luety | July 19, 1949 |
| 2,542,755 | Dietrich | Feb. 20, 1951 |
| 2,580,239 | Murch | Dec. 25, 1951 |